United States Patent [19]

Sawyer et al.

[11] Patent Number: 4,830,907

[45] Date of Patent: May 16, 1989

[54] FINE DENIER FIBERS OF OLEFIN POLYMERS

[75] Inventors: Lawrence H. Sawyer; George W. Knight, both of Lake Jackon, Tex.

[73] Assignee: The Dow Chemical Company, Midland, Mich.

[21] Appl. No.: 672,009

[22] Filed: Nov. 6, 1984

Related U.S. Application Data

[63] Continuation-in-part of Ser. No. 581,480, Feb. 17, 1984, abandoned.

[51] Int. Cl.$^4$ .................... C08F 210/16; D03D 15/00; D04H 3/16

[52] U.S. Cl. .................................... 428/225; 57/243; 57/255; 57/256; 66/202; 139/420 A; 139/426 R; 156/62.4; 428/229; 428/296; 428/339; 428/357; 428/359; 428/401; 526/348.1

[58] Field of Search .......................... 57/243, 255, 256; 66/202; 139/420 A, 426 R; 428/225, 229, 296, 339, 357, 359, 401; 526/348.1

[56] References Cited

U.S. PATENT DOCUMENTS 4,076,698  2/1978  Anderson .
4,181,762  1/1980  Benedyk .
4,258,097  3/1981  Benedyk .
4,356,220  10/1982  Benedyk .
4,394,474  7/1983  McKinney et al. .
4,460,745  7/1984  Adur et al. .

FOREIGN PATENT DOCUMENTS 264991  12/1963  Australia .
0048227  3/1982  .

OTHER PUBLICATIONS

*Research Disclosure,* Jun., 1983 (230), Item 23025.
*Man Made Fibers and Textile Dictionary,* published by Celanese Corp., pp. 72–73.
Moncrief, R. W., *Man–Made Fibers,* John Wiley and Sons, London/New York, 1975, p. 3.
Ziabicki, andrzij *Fundamentals of Fiber Formation,* John Wiley and Sons, London/New York, 1976 p. 196.

*Primary Examiner*—James C. Cannon
*Attorney, Agent, or Firm*—Walter J. Lee

[57] ABSTRACT

Fine denier fibers and/or multi-filaments prepared from linear low density polyethylene copolymers (LLDPE) are found to offer advantages over other forms of polyolefins.

25 Claims, No Drawings

FINE DENIER FIBERS OF OLEFIN POLYMERS

CROSS-REFERENCE TO RELATED APPLICATION

This is a continuation-in-part of Ser. No. 581,480, filed Feb. 17, 1984, now abandoned.

BACKGROUND OF THE INVENTION

There are, basically, two types of olefin polymerization techniques for preparing high molecular weight olefin polymers and copolymers. The oldest commercial technique involves high pressure, high temperature, and the use of a free radical initiator, such as a peroxide; these type polymers are generally known as low density polyethylene (LDPE) and are also known as high pressure polyethylene (HPPE) and as ICI-type polyethylenes. These LDPE polymers contain branched chains of polymerized monomer units pendant from the main polymer "backbone" and generally have densities in the range of about 0.910–0.935 gms/cc.

The other commercially-used technique involves coordination catalysts of the "Ziegler" type or "Phillips" type and includes variations of the Ziegler type, such as the Natta type. These catalysts may be used at very high pressures, but may also (and generally are) used at very low or intermediate pressures. The products made by these coordination catalysts are generally known as "linear" polymers because of the substantial absence of branched chains of polymerized monomer units pendant from the main polymer "backbone", and they are also generally known as high density polyethylene (HDPE). It is modified version of those "linear" polymers to which the present invention pertains. Linear polyethylene (HDPE) ordinarily has a density in the range of 0.941 to 0.965 gms/cc.

In particular, the present invention pertains to "linear" type ethylene polymers wherein ethylene has been polymerized along with minor amounts of alpha, beta-ethylenically unsaturated alkenes having from 3 to 12 carbons per alkene molecule, preferably 4 to 8. The amount of the alkene comonomer is generally sufficient to cause the density of the polymer to be substantially in, or approaching, the same density range as LDPE, due to the alkyl sidechains on the polymer molecule, yet the polymer remains in the "linear" classification; they are conveniently referred to as "linear low density polyethylene" (LLDPE). These polymers retain much of the strength, crystallinity, and extensibility normally found in HDPE homopolymers of ethylene, while also exhibiting characteristics of LDPE such as toughness and low modulus.

The present invention pertains to fine denier fibers and multi-filaments of the LLDPE ethylene copolymers. It is believed that U.S. Pat. No. 4,181,762, U.S. Pat. No. 4,258,097, and U.S. Pat. No. 4,356,220 are representative of the most relevant fiber art of which we are aware. U.S. Pat. No. 4,076,698 discloses methods of producing LLDPE polymers and discloses extrusion of a monofilament.

Convenient references relating to fibers and filaments, including those of man-made thermoplastics, and incorporated herein by reference, are, for example:

(a) *Encyclopedia of Polymer Science and Technology*, Interscience, New York, Vol. 6 (1967) pp 505–555 and Vol. 9 (1968) pp 403–440;

(b) *Man-Made Fiber and Textile Dictionary*, published by Celanese Corporation;

(c) Fundamentals of Fibre Formation—The Science of Fibre Spinning and Drawing, by Andrzij Ziabicki, published by John Wiley & Sons, London/New York, 1976;

(d) *Man-Made Fibres*, by R. W. Moncrieff, published by John Wiley & Sons, London/New York, 1975;

(e) *Kirk-Othmer Encyclopedia of Chemical Technology*, Vol. 16 for "Olefin Fibers", published by John Wiley & Sons, New York, 1981, 3rd Edition.

SUMMARY OF THE INVENTION

Fine denier fibers and multi-filaments are fabricated, which comprise linear low density ethylene copolymers (LLDPE).

DETAILED DESCRIPTIONS

The present invention pertains to multi-filaments and fine denier fibers fabricated from ethylene/alpha-olefin copolymers, i.e., alpha-olefins of $C_3$–$C_{12}$. This invention will be applicable in nonwoven, woven, knitted and composite fibrous structures. Examples may be diaper innerfacing, sanitary products, medical products, sheeting, drapes, disposable clothing, protective clothing, outdoor fabrics, industrial fabrics, netting, bagging, membranes, filters, rope, cordage and other fibrous products. The invention exhibits improved properties such as softness, lower heat distortion temperature, wider heat seal range, good drawdown, environmental stress crack resistance, good melt strength, good tensiles, high elastic recovery, good stability to ionizing radiation, and resistance to fibrillation as compared to high density polyethylene (HDPE), low density polyethylene (LDPE), polypropylene (PP), polyesters, and nylons. Selected properties from the above may be obtained in filaments and fibers from these latter resins, but many other properties are lost, or absent, as a rsult. The invention represents a unique combination of property advantages where specific property emphasis is possible without losing unrelated property advantages. These property improvements in multi-filament and fine denier fiber form may be further developed and altered through processing by melt, solution or composite fiber spinning processes. The resin and fiber properties are considered to be ideally suited to melt forming processes of the spun bonded, melt blown and high speed spin-draw type.

In conformity with commonly accepted vernacular or jargon of the fiber and filament industry, the following definitions apply to the terms used in this disclosure:

A "monofilament" (a.k.a. monofil) refers to an extruded individual strand of denier greater than 15, usually greater than 30;

A "fine denier fiber of filament" refers to an extruded strand of denier less than about 15;

A "multi-filament" (a.k.a. multifil) refers to simultaneously extruded fine denier filaments formed as a bundle of fibers, generally containing at least 3, preferably at least about 15–100 fibers and can be several hundred or several thousand;

"Staple fibers" refer to fine denier strands which have been formed at, or cut to, staple lengths of generally about 1 to about 8 inches;

An "extruded strand" refers to an extrudate formed by passing polymer through a forming-orifice, such as a die.

Whereas it is known that virtually any thermoplastic polymer can be extruded as a coarse strand or monofilament, many of these, such as polyethylene and some ethylene copolymers, have not generally been found to be suitable for the making of fine denier fibers or multifilaments. Practitioners are aware that it is easier to make a coarse monofilament yarn of 15 denier than to make a multi-filament yarn of 15 denier. It is also recognized that the mechanical and thermal conditions experienced by a bundle of filaments, whether in spinning staple fibers or in multi-filament yarns, are very different to those in spinning monofilaments. The fact that a given man-made polymer can be extruded as a monofilament, does not necessarily herald its use in fine denier or multi-filament extrudates.

This invention utilizes a particular class of resin for conversion into multi-filament and fine denier fiber where the fiber geometry exhibits improvements in specific properties or combination of properties that are developed through the resin and processing characteristics. The resins, classsified as linear low density polyethylene copolymers LLDPE, yield multi-filaments and fine denier fibers with improved physical properties when compared to fibrous products from polypropylene (PP), low density polyethylene (LDPE), and high density polyethylene (HDPE). LDPE and HDPE are said to form useful monofilaments, but are generally regarded as ill-suited for multi-filaments or fine denier fibers. LLDPE multi-filaments and fine denier fibers are found to possess superior tactile properties such as softness, process advantages, and use characteristics that can be selectively enhanced by the resin nature.

For a given molecular weight resin, as determined from melt index, LLDPE filament formation is less susceptible to flow instabilities such as melt fracture and excessive die swell than processes with HDPE or PP. Under these conditions the LLDPE resins maintain better melt strength while allowing enhanced drawdown and formation of fine denier multi-filaments compared to LDPE, HDPE and PP. LLDPE filaments of this invention readily draw at lower temperatures to high draw ratios while exhibiting superior resistance to fibrillation. These LLDPE filaments and fibers develop comparable tenacities to PP and HDPE with improved toughness (work to rupture) and environmental stress crack resistance. LLDPE thermal characteristics impart a lower heat distortion temperature and wide heat seal range to filaments and fibers while resulting in high strength heat seals as compared to HDPE and PP filaments. The resin thermal response allows partial fusion of the fibrous structure during bonding or sealing while the fiber geometry is retained and fiber performance properties, such as hand, persist. Improved stability to ionizing radiation make LLDPE filaments and fibers more suitable for use in environments or applications subject to UV, beta or gamma irradiation than PP fibers.

LLDPE multi-filaments and fine denier fibers are considered to be especially suited to nonwoven applications such as disposable diaper innerliners. Presently, in the market place, these innerliners are primarily polyester staple webs. PP fiber webs are gaining acceptance and replacing polyester because of softness and price advantages. LLDPE fibers of the present invention are much softer than PP fibers, resin prices are similar and LLDPE products offer additional advantages over PP. Because of the great improvement in softness, LLDPE fibers do not need to be as fine as PP. This offers process advantages, since very fine denier filaments (less than 2 denier) are more difficult to make, and may allow increased production rates. The LLDPE fibers of this invention have been produced as ultra fine denier multifilaments with individual filaments being sub-denier (less than 1 denier). The thermal bonding characteristics of LLDPE will allow fibers from these resins to thermally bond directly to the diaper backsheet, which is usually ordinary polyethylene film, whereas PP and polyester are usually glued. Additional advantages may be realized due to the LLDPE processing and drawdown characteristics.

The LLDPE polymers for use in the present invention are those which contain, as copolymerized monomer units along the polymer chain, a $C_3$–$C_{12}$ alpha-olefin, especially a $C_3$–$C_{10}$ alpha-olefin, most especially a $C_4$–$C_8$ alpha-olefin; octene-1 is a particularly preferred embodiment. Mixtures of said alpha-olefin comonomers are also within the purview of the present invention, such as 1-butene/1-octene/1-hexene or 1-butene/1-octene. The amount of the comonomer in the polymer chain which will provide a density of about 0.86 to about 0.95, especially about 0.90 to about 0.94, will depend on the particular comonomer (or mixture of comonomers) copolymerized with the ethylene. Usually about 1% to about 30% by weight of the comonomer will assure production of a density in the desired range. Generally speaking, on a molar basis, more of a small alpha-olefin (such as propylene) is needed, to produce a given change in density, than is a large alpha-olefin (such as dodecene) to produce the same change in density.

The melt index (a.k.a. melt flow value) of the LLDPE polymer, as measured according to ASTM D-1238(E), is preferably in the range of 0.01–400 gms/10 min, more preferably in the range of about 0.1 to about 300 gms/10 min, most preferably in the range of about 6 to about 300 gms/10 min.

The ethylene/alpha-olefin copolymers of the present invention, LLDPE, are fabricated into multi-filament and fine denier fiber form by melt, solution, or composite spinning processes. Melt type spinning processes are the preferred route for fabrication. Fine denier fibers may be formed directly by melt blown and spray spun type processing or cut from continuous filament products. Fine denier filaments may be produced and collected as packages by conventional melt spinning processes with or without inline or after-drawing. Fine denier filaments may also be produced and collected in nonwoven web form by spun bonded processes. Fine denier filaments and fibers can then be processed further by existing fiber handling processes that include carding, nonwoven fabric production, calendering, staple yarn formation, continuous yarn texturizing and forming, knitting and weaving. The processes of filament and fiber formation as well as subsequent processing like fabric formation benefit from the processability of the fibers of the present invention and yield a product that exhibits beneficial properties of the ethylene/alpha-olefin LLDPE resin such as softness. In the present invention, the preferred spinning temperature is in the range of about 125° C. to about 350° C., most preferably about 190° C. to about 300° C. The preferred spinning pressure is in the range of about 50 psi to about 30,000 psi, most preferably about 200 psi to about 8,000 psi. The melting range of LLDPE is largely dependent on the particular alpha-olefin comonomers and the amount used.

The making of polymeric fine denier fibers and multi-filaments is well known to practitioners of the art and those skilled in the art will be able to adapt the present invention into that art.

The present invention provides fine denier filaments, fibers and fibrous products such as fabric with properties or combinations of properties not readily available in other fiber forming materials. The invention shows distinct improvement of specific properties over polypropylene and polyester fibers, as well as benefits over high density polyethylene, low density polyethylene and nylon type fibers. Among other advantages, the present invention yields softer fibrous products and has lower thermal bonding characteristics than either polypropylene or polyester. This invention is more stable to ionizing radiation and more resistant to fibrillation than polypropylene and it is more resistant to degradative chemical environments than polyester and nylon.

The following examples illustrate certain embodiments, but the present invention is not limited to these specific embodiments.

EXAMPLE 1

An ethylene/octene copolymer with 6.0 MI and 0.919 gms/cc density was melt extruded at 230° C. into continuous multi-filament form. A 24 filament bundle was produced with 60-80X spin draw and take-up at 1000-1750 m/min without additional draw. The 14-9 denier filaments had good hand and would readily draw 3-4X without loss of hand to give 2-3 denier filaments.

EXAMPLE 2

Staple fiber cut from 14 denier multi-filaments, as in Example 1 above, exhibited exceptional softness, having a comparable hand to 1.5 denier PP fiber. Staple fiber was processed on a card, a Garnett, and a Rando-Webber to form nonwoven webs. The fiber ran well and light weight, soft webs were collected.

EXAMPLE 3

Samples of LLDPE staple fine denier fibers were blended with cotton and polyester fibers and the blends were exposed to various heat bonding regimes. Bonding occurred rapidly and the LLDPE fibers could be compressed completely to form a localized film, or fused just to the point of allowing point bonds at fiber junctions. Good, strong bonding resulted in all cases with the point bond samples exhibiting superior tactile properties.

EXAMPLE 4

Samples of unstabilized LLDPE (14 denier) and HDPE (25 denier) filament were exposed to 2 Mrad of gamma radiation at 0.2 Mrad per hour from a $Co^{60}$ source. The LLDPE showed no loss of tensile properties while the HDPE sample exhibited a decrease in both ultimate tensile strength (tenacity) and elongation.

|  | Before Exposure | | After 2 Mrad Exposure | |
| --- | --- | --- | --- | --- |
|  | Tenacity (g/den) | Elongation % | Tenacity (g/den) | Elongation % |
| LLDPE filaments | 1.62 | 950 | 1.64 | 950 |
| HDPE filaments | 1.42 | 670 | 1.27 | 510 |

EXAMPLE 5

An ethylene/octene copolymer with 50.0 MI and 0.926 2/cc density (LLDPE) was melt extruded at 180° C. into continous multi-filament form. The filament bundle was attenuated by high speed air to give a final fiber diameter of 8 microns. These ultra fine denier or sub-denier fibers, 0.4 denier per filament in the bundle, can be handled in the same ways as fine denier fibers.

EXAMPLE 6 (COMPARATIVE EXAMPLE)

A low density branched polyethylene, LDPE, with 6.75 M.I., 0.919 gms/cc density was used in an attempt to produce a multi-filament bundle. The LDPE was melt extruded through a 34 hole spinnerette. The resulting filaments were of poor uniformity and take up rates were limited to a slow rate of 186 m/min by filament breakage. The minimum denier of the individual LDPE filaments produced during the attempt at multi-filament formation was 65 denier. LDPE is not suitable for making fine denier filaments or multi-filaments.

We claim:

1. A fine denier multi-filament composition, being of less than about 15 denier, comprised of linear low density copolymers of ethylene with at least one alpha-olefin of $C_3$ to $C_{12}$, said copolymer having a density in the range of about 0.86 to about 0.95 gms/cc.

2. The composition of claim 1 wherein the alpha-olefin is at least one of $C_4$ to $C_8$.

3. The composition of claim 1 wherein the copolymer has a density in the range of about 0.90 to about 0.94 gms/cc.

4. The composition of claim 1 wherein the copolymer has a melt flow value in the range of about 0.01 to about 400 gms/10 min.

5. The composition of claim 1 wherein the copolymer has a melt flow value in the range of about 6 to about 300 gms/10 min.

6. The composition of claim 1 wherein the alpha-olefin of $C_3$ to $C_{12}$ comprises about 1% to about 30% of the weight of the copolymer.

7. The composition of claim 1 wherein the alpha-olefin comprises at least one of $C_4$-$C_{12}$.

8. The composition of claim 1 wherein the alpha-olefin comprises 1-octene.

9. The composition of claim 1 wherein the alpha-olefin comprises 1-octene and 1-butene.

10. The composition of claim 1 wherein the alpha-olefin comprises 2 or more of the $C_3$ to $C_{12}$ olefins.

11. The composition of claim 1 wherein the fine denier multi-filaments comprise a non-woven web.

12. The composition of claim 1 wherein the fine denier multi-filaments comprise a filament bundle.

13. The composition of claim 1 wherein the fine denier multi-filaments are in blended form with other forms of fibers.

14. The composition of claim 1 wherein the size of the fine denier multi-filament is in the range of about 1 denier to about 14 denier.

15. The composition of claim 1 wherein the fine denier multi-filaments comprise a woven fabric.

16. The composition of claim 1 wherein the finer denier multi-filaments comprise a knitted fabric.

17. The composition of claim 1 wherein the multi-filaments are sub-denier.

18. The fine denier multi-filaments of claim 1, blended with cotton fibers.

19. The fine denier multi-filaments of claim 1, blended with polyester fibers.

20. A fine sub-denier fiber composition comprised of linear low density copolymers of ethylene with at least one alpha-olefin of $C_3$ to $C_{12}$,
   wherein said copolymer has a density in the range of about 0.86 to about 0.95 gms/cc and a melt flow value in the range of about 0.01 to about 400 gms./10 min,
   said fiber composition comprising a filament bundle, a non-woven web, a woven fabric, a knitted fabric, or staple fibers.

21. The composition of claim 20 wherein the fine sub-denier fibers are in blended form with other forms of fibers.

22. The sub-denier fibers of claim 20, blended with cotton fibers.

23. The sub-denier fibers of claim 20, blended with polyester fibers.

24. A fine denier multi-filament composition comprised of linear low density copolymers of ethylene with at least one alpha-olefin of $C_3$ to $C_{12}$,
   wherein said copolymer has a density in the range of about 0.86 to about 0.95 gms/cc and a melt flow value in the range of about 0.01 to about 400 gms/10 min,
   said multi-filament composition comprising a filament bundle, a non-woven web, a woven fabric, a knitted fabric, or staple fibers.

25. The composition of claim 24 wherein the multi-filaments are in blended form with other forms of fibers.

* * * * *

UNITED STATES PATENT AND TRADEMARK OFFICE
CERTIFICATE OF CORRECTION

PATENT NO. : 4,830,907
DATED : May 16, 1989
INVENTOR(S) : Lawrence H. Sawyer, et al It is certified that error appears in the above-identified patent and that said Letters Patent is hereby corrected as shown below:

Coverpage, Left column, Inventors; change "Jackon" to --Jackson--.

Column 1, Line 34; change "version" to --versions--.

Column 1, Line 34; change "those" to --these--.

Column 2, Line 39; change "rsult" to --result--.

Column 2, Line 56; change "of" to --or--.

Column 3, Line 21; change "classsified" to --classified--.

Column 5, Line 53; Example 4; change "filament" to --filaments--.

Signed and Sealed this

Fourth Day of December, 1990

Attest:

HARRY F. MANBECK, JR.

*Attesting Officer*          *Commissioner of Patents and Trademarks*

UNITED STATES PATENT AND TRADEMARK OFFICE
CERTIFICATE OF CORRECTION

PATENT NO. : 4,830,907

DATED : May 16, 1989

INVENTOR(S) : Lawrence H. Sawyer and George W. Knight

It is certified that error appears in the above-identified patent and that said Letters Patent is hereby corrected as shown below:

On the cover page, the left column, "Filed: Nov. 6, 1984" should read --Filed: Nov. 16, 1984--.

Signed and Sealed this

Twentieth Day of April, 1993

*Attest:*

MICHAEL K. KIRK

*Attesting Officer*      *Acting Commissioner of Patents and Trademarks*